H. D. DANN.

SAW-MILL DOG.

No. 6,733. Reissued Nov. 9, 1875.

WITNESSES:

P. C. Dieterich

W. C. McArthur

INVENTOR:

Henry D. Dann per J. H. Alexander

ATTORNEY.

N. PETERS, PHOTO-LITHOGRAPHER, WASHINGTON, D. C.

UNITED STATES PATENT OFFICE.

HENRY D. DANN, OF OSHKOSH, WISCONSIN.

IMPROVEMENT IN SAW-MILL DOGS.

Specification forming part of Letters Patent No. 134,653, dated January 7, 1873; reissue No. 6,071, dated September 29, 1874; reissue No. 6,733, dated November 9, 1875; application filed February 9, 1875.

*To all whom it may concern:*

Be it known that I, HENRY D. DANN, of Oshkosh, in the county of Winnebago and State of Wisconsin, have invented certain new and useful Improvements in Saw-Mill Dogs; and I do hereby declare that the following is a full, clear, and exact description thereof, reference being had to the accompanying drawings, and to the letters of reference marked thereon, which form a part of this specification.

The nature of my invention consists in the construction and arrangement of a dog for saw-mills, as will be hereinafter more fully set forth.

In order to enable others skilled in the art to which my invention appertains to make and use the same, I will now proceed to describe its construction and operation, referring to the annexed drawings, in which—

Figure 1:
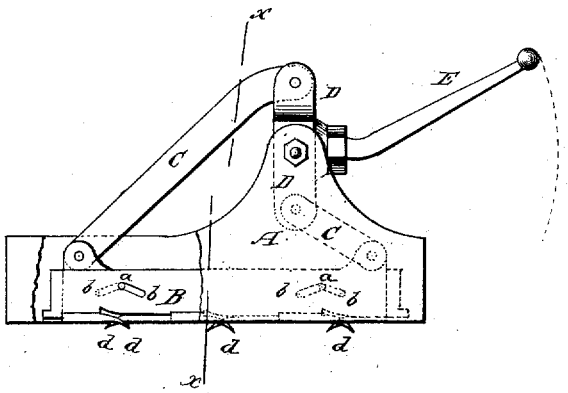
Figure 2:
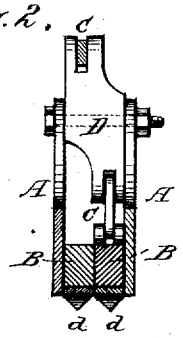
Figure 3:
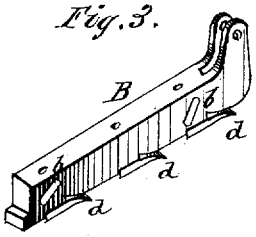

Figure 1 is a side view, and Fig. 2 a cross-section, of my device. Fig. 3 is a perspective view of one of the knife-bars.

A represents the case or box, in which the knives constituting the dog move out and in. This box or case may either be bolted to the ordinary standard, or made solid and form the standard, in either case receiving and protecting the knives or spurs which form the dog. It guards the knives from the knots, and also prevents the last board from springing as the knives draw the logs, boards, or scantling firmly to the standard or box. In the case or box are placed two bars, B B, which are held in the same by pins *a a*, passing through the sides of the box and through inclined slots *b b* in the bars. The opposite ends of the bars B B are, by connecting-bars C C, connected with a cross-head, D, which is pivoted between projecting ears on the back of the box, and provided with a lever, E, for operating the same. By the movement of the lever E in one direction, one of the bars B will move up and the other down, and at the same time they will move outward toward the front of the box by the action of the inclined slots *b b* on the pins *a a*. By the movement of the lever in the contrary direction the bars B B will be moved in the opposite direction, and at the same time be moved inwardly from the front of the box. To the front edges of the bars B B are secured the knives *d d*, the points of which are bent outwardly and pointed, as shown. The knives of the two bars point toward each other, so that when the bars are moved outwardly the knives will enter the wood and lock together, preventing the log from slipping down or off from the end of the block, which is often the case when the log is rounded on the under side, when it is to be undogged and turned over.

The pins *a a* may pass through holes in the bars B B, and slide in inclined slots in the bars, as above described, or the same movement of the bars may be effected by means of eccentrics.

Having thus fully described my invention, what I claim as new, and desire to secure by Letters Patent, is—

1. In a saw-mill dog, the combination of the knives *d d*, arranged to move past each other in opposite directions and engage with the log, substantially in the manner set forth.

2. The combination of the box or case A, bars B B, with interlocking knives *d d*, inclined slots *b b*, pins *a a*, connecting-bars C C, cross-head D, and lever E, all constructed and arranged substantially as and for the purposes herein set forth.

In testimony that I claim the foregoing as my own I affix my signature in presence of two witnesses.

HENRY D. DANN.

Witnesses:
R. L. OLIVER,
W. H. TAYLOR.